United States Patent
Park

(10) Patent No.: US 10,852,509 B2
(45) Date of Patent: Dec. 1, 2020

(54) OPTICAL SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 233 days.

(21) Appl. No.: 15/070,455

(22) Filed: Mar. 15, 2016

(65) Prior Publication Data

US 2017/0045718 A1  Feb. 16, 2017

(30) Foreign Application Priority Data

Aug. 10, 2015  (KR) .................. 10-2015-0112495

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC .......... G02B 9/64; G02B 9/62; G02B 13/001; G02B 13/002; G02B 13/0045
USPC ................................................. 359/713, 708
See application file for complete search history.

(56) References Cited

U.S. PATENT DOCUMENTS

| | | |
|---|---|---|
| 6,163,410 A | 12/2000 | Nagaoka |
| 9,201,216 B2 | 12/2015 | Huang et al. |
| 2012/0206822 A1 | 8/2012 | Hsieh et al. |
| 2015/0124333 A1* | 5/2015 | Noda .................. G02B 13/0045 359/713 |
| 2015/0212296 A1* | 7/2015 | Huang ............... G02B 13/0045 348/335 |
| 2015/0241659 A1* | 8/2015 | Huang ................. H04N 5/2254 348/360 |
| 2016/0131899 A1 | 5/2016 | Jo |
| 2016/0259150 A1* | 9/2016 | Shin .................... G02B 27/0025 |

FOREIGN PATENT DOCUMENTS

| | | |
|---|---|---|
| CN | 104808316 A | 7/2015 |
| CN | 105938238 A | 9/2016 |
| CN | 106199903 A | 12/2016 |
| EP | 3064976 A2 | 7/2016 |
| JP | 2004-240464 A | 8/2004 |

(Continued)

OTHER PUBLICATIONS

Korean Office Action dated Feb. 7, 2017 in corresponding Korean patent application No. 10-2015-0112495 (6 pages in English; 5 pages in Korean).

(Continued)

*Primary Examiner* — Travis S Fissel
(74) *Attorney, Agent, or Firm* — NSIP Law

(57) ABSTRACT

An optical system includes a first lens including a negative refractive power and a convex object-side surface, a second lens, and a third lens including a negative refractive power and a convex object-side surface. The optical system also includes a fourth lens, a fifth lens including a negative refractive power, and a sixth lens including a negative refractive power and comprising an inflection point on an image-side surface thereof. The first to sixth lenses are sequentially disposed from an object toward an imaging plane.

22 Claims, 18 Drawing Sheets

(56) References Cited

FOREIGN PATENT DOCUMENTS

| | | |
|---|---|---|
| JP | 2009-25534 A | 2/2009 |
| KR | 10-2016-0108080 A | 9/2016 |
| TW | 201423145 A | 6/2014 |

OTHER PUBLICATIONS

Korean Office Action dated Jun. 26, 2017 in corresponding Korean Patent Application No. 10-2015-0112495 (8 pages in English and 6 pages in Korean).

Chinese Office Action dated May 28, 2018 in corresponding Chinese Application No. 201610186710.7 (11 pages in English, 8 pages in Chinese).

\* cited by examiner

| FIRST EMBODIMENT ||||||
|---|---|---|---|---|---|
| F number= 2.09 | TTL = | 5.211 | f = | 4.492 ||
| SURFACE NUMBER | | RADIUS OF CURVATURE | THICKNESS/ DISTANCE | REFRACTIVE INDEX | ABBE NUMBER | FOCAL LENGTH |
| 0 | | Infinity | 0.0000 | | | |
| 1 | FIRST LENS | 1.8836 | 0.3638 | 1.547 | 56.1 | -47457.1 |
| 2 | | 1.7549 | 0.0610 | | | |
| 3 | SECOND LENS | 1.5724 | 0.6186 | 1.547 | 56.1 | 2.788 |
| 4 | | -42.3218 | 0.0000 | | | |
| 5 | STOP | Infinity | 0.0350 | | | |
| 6 | THIRD LENS | 6.2331 | 0.2090 | 1.657 | 21.5 | -5.794 |
| 7 | | 2.3328 | 0.4994 | | | |
| 8 | FOURTH LENS | -9.8565 | 0.3759 | 1.657 | 21.5 | 158.832 |
| 9 | | -9.1426 | 0.5097 | | | |
| 10 | FIFTH LENS | 7.0837 | 0.4518 | 1.657 | 21.5 | -176353.3 |
| 11 | | 6.9041 | 0.2682 | | | |
| 12 | SIXTH LENS | 2.5626 | 0.7632 | 1.537 | 55.7 | -13.349 |
| 13 | | 1.6914 | 0.2008 | | | |
| 14 | FILTER | Infinity | 0.2100 | 1.519 | 64.2 | |
| 15 | | Infinity | 0.6443 | | | |
| 16 | IMAGING PLANE | Infinity | | | | |

| SURFACE NUMBER | 1 | 2 | 3 | 4 | 6 | 7 | 8 | 9 | 10 | 11 | 12 | 13 |
|---|---|---|---|---|---|---|---|---|---|---|---|---|
| RADIUS OF CURVATURE | 1.8836 | 1.7549 | 1.5724 | -42.3218 | 6.2331 | 2.3528 | -9.8565 | -9.1426 | 7.0697 | 6.9041 | 2.5626 | 1.6914 |
| CONIC CONSTANT (K) | -0.953 | -3.398 | -1.472 | 0.000 | 38.076 | -9.285 | 0.000 | 0.000 | 7.860 | 0.949 | -2.956 | -5.254 |
| 4-TH ORDER COEFFICIENT (A) | -0.017 | -0.105 | -0.088 | -0.333 | -0.101 | 0.044 | -0.081 | -0.076 | -0.007 | -0.049 | -0.221 | -0.092 |
| 6-TH ORDER COEFFICIENT (B) | 0.001 | 0.001 | 0.087 | 0.062 | 0.234 | 0.072 | -0.048 | -0.060 | -0.100 | 0.004 | 0.107 | 0.036 |
| 8-TH ORDER COEFFICIENT (C) | -0.013 | -0.086 | -0.296 | -0.215 | -0.600 | -0.048 | 0.192 | 0.180 | 0.080 | -0.008 | -0.030 | -0.010 |
| 10-TH ORDER COEFFICIENT (D) | 0.010 | 0.269 | 0.774 | 0.555 | 1.370 | -0.001 | -0.303 | -0.220 | -0.049 | 0.005 | 0.005 | 0.002 |
| 12-TH ORDER COEFFICIENT (E) | -0.001 | -0.266 | -0.891 | -0.766 | -2.015 | 0.043 | 0.258 | 0.164 | 0.016 | -0.002 | -0.001 | 0.000 |
| 14-TH ORDER COEFFICIENT (F) | 0.001 | 0.145 | 0.517 | 0.341 | 1.360 | -0.057 | -0.092 | -0.080 | -0.007 | 0.000 | 0.000 | 0.000 |
| 16-TH ORDER COEFFICIENT (G) | -0.001 | -0.033 | -0.128 | -0.158 | -0.499 | 0.038 | 0.000 | 0.000 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

| SECOND EMBODIMENT ||||||
|---|---|---|---|---|---|
| F number= 2.07 | | TTL = 5.104 | | f = | 4.402 |
| SURFACE NUMBER | | RADIUS OF CURVATURE | THICKNESS/ DISTANCE | REFRACTIVE INDEX | ABBE NUMBER | FOCAL LENGTH |
| 0 | | Infinity | 0.0000 | | | |
| 1 | FIRST LENS | 1.8519 | 0.3591 | 1.547 | 56.1 | −40047.4 |
| 2 | | 1.7249 | 0.0598 | | | |
| 3 | SECOND LENS | 1.5521 | 0.5839 | 1.547 | 56.1 | 2.780 |
| 4 | | −62.1852 | 0.0000 | | | |
| | STOP | Infinity | 0.0350 | | | |
| 5 | THIRD LENS | 6.2260 | 0.2078 | 1.657 | 21.5 | −5.758 |
| 6 | | 2.3230 | 0.4831 | | | |
| 7 | FOURTH LENS | −10.7809 | 0.3540 | 1.657 | 21.5 | 69.59 |
| 8 | | −8.8384 | 0.5182 | | | |
| 9 | FIFTH LENS | 6.7116 | 0.4139 | 1.657 | 21.5 | −405.09 |
| 10 | | 6.3864 | 0.2824 | | | |
| 11 | SIXTH LENS | 2.4470 | 0.7510 | 1.537 | 55.7 | −13.722 |
| 12 | | 1.8400 | 0.2019 | | | |
| 13 | FILTER | Infinity | 0.2100 | 1.519 | 64.2 | |
| 14 | | Infinity | 0.6438 | | | |
| 15 | IMAGING PLANE | Infinity | 0.0000 | | | |

FIG. 7

| SURFACE NUMBER | 1 | 2 | 3 | 4 | 6 | 7 | 8 | 9 | 10 | 11 | 12 | 13 |
|---|---|---|---|---|---|---|---|---|---|---|---|---|
| RADIUS OF CURVATURE | 1.8519 | 1.7249 | 1.5521 | -62.1852 | 6.2260 | 2.3230 | -10.7309 | -3.8384 | 6.7116 | 6.3864 | 2.4470 | 1.6430 |
| CONIC CONSTANT (K) | -0.974 | -3.297 | -1.461 | 0.000 | 36.136 | -9.039 | 0.000 | 0.000 | 7.860 | 0.949 | -3.065 | -4.968 |
| 4-TH ORDER COEFFICIENT (A) | -0.018 | -0.107 | -0.093 | -0.034 | -0.163 | 0.043 | -0.063 | -0.079 | -0.006 | -0.057 | -0.235 | -0.100 |
| 6-TH ORDER COEFFICIENT (B) | 0.001 | 0.023 | 0.065 | 0.074 | 0.238 | 0.086 | -0.057 | -0.065 | -0.099 | 0.018 | 0.117 | 0.041 |
| 8-TH ORDER COEFFICIENT (C) | -0.014 | -0.076 | -0.324 | -0.261 | -0.699 | -0.094 | 0.223 | 0.192 | 0.083 | -0.019 | -0.034 | -0.013 |
| 10-TH ORDER COEFFICIENT (D) | 0.013 | 0.318 | 0.898 | 0.725 | 1.347 | 0.071 | -0.357 | -0.241 | -0.053 | 0.009 | 0.006 | 0.003 |
| 12-TH ORDER COEFFICIENT (E) | -0.007 | -0.373 | -1.086 | -1.013 | -1.985 | -0.055 | 0.310 | 0.184 | 0.018 | -0.002 | -0.001 | 0.000 |
| 14-TH ORDER COEFFICIENT (F) | 0.006 | 0.208 | 0.655 | 0.732 | 1.549 | 0.015 | -0.112 | -0.069 | -0.002 | 0.000 | 0.000 | 0.000 |
| 16-TH ORDER COEFFICIENT (G) | -0.003 | -0.051 | -0.174 | -0.220 | -0.500 | 0.020 | 0.020 | 0.009 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 8

| THIRD EMBODIMENT ||||||
|---|---|---|---|---|---|
| F number= 2.08 | TTL = 5.104 | | f = 4.392 | | |
| SURFACE NUMBER | | RADIUS OF CURVATURE | THICKNESS/ DISTANCE | REFRACTIVE INDEX | ABBE NUMBER | FOCAL LENGTH |
| 0 | | Infinity | 0.0000 | | | |
| 1 | FIRST LENS | 1.9657 | 0.3889 | 1.547 | 56.1 | -95.513 |
| 2 | | 1.7619 | 0.0387 | | | |
| 3 | SECOND LENS | 1.5855 | 0.6002 | 1.547 | 56.1 | 2.716 |
| 4 | | -20.1389 | 0.0000 | | | |
| | STOP | Infinity | 0.0350 | | | |
| 5 | THIRD LENS | 6.2709 | 0.2306 | 1.657 | 21.5 | -6.192 |
| 6 | | 2.4323 | 0.5087 | | | |
| 7 | FOURTH LENS | -22.2480 | 0.3274 | 1.657 | 21.5 | 62.41 |
| 8 | | -14.5096 | 0.5331 | | | |
| 9 | FIFTH LENS | -1000.0000 | 0.4847 | 1.657 | 21.5 | -196.150 |
| 10 | | 148.0654 | 0.1263 | | | |
| 11 | SIXTH LENS | 2.3063 | 0.7325 | 1.537 | 55.7 | -11.896 |
| 12 | | 1.5065 | 0.2438 | | | |
| 13 | FILTER | Infinity | 0.2100 | 1.519 | 64.2 | |
| 14 | | Infinity | 0.6436 | | | |
| 15 | IMAGING PLANE | Infinity | 0.0000 | | | |

FIG. 11

| SURFACE NUMBER | 1 | 2 | 3 | 4 | 5 | 6 | 7 | 8 | 9 | 10 | 11 | 12 | 13 |
|---|---|---|---|---|---|---|---|---|---|---|---|---|---|
| RADIUS OF CURVATURE | 1.9657 | 1.7619 | 1.5855 | -20.1380 | 6.2709 | 2.4323 | -22.2480 | -14.5096 | -1000.0000 | 148.0654 | 2.3003 | 1.5083 |
| CONIC CONSTANT (K) | -1.228 | -3.574 | -1.358 | 0.000 | 36.106 | -9.362 | 0.000 | 0.000 | 7.860 | 2089.302 | -2.611 | -5.272 |
| 4-TH ORDER COEFFICIENT (A) | -0.019 | -0.102 | -0.096 | -0.054 | -0.117 | 0.036 | -0.075 | -0.061 | 0.072 | 0.019 | -0.241 | -0.093 |
| 6-TH ORDER COEFFICIENT (B) | 0.001 | 0.005 | 0.085 | 0.203 | 0.331 | 0.098 | -0.070 | -0.114 | -0.199 | -0.072 | 0.121 | 0.038 |
| 8-TH ORDER COEFFICIENT (C) | -0.041 | -0.142 | -0.388 | -0.672 | -0.894 | -0.108 | 0.231 | 0.278 | 0.140 | 0.035 | -0.034 | -0.010 |
| 10-TH ORDER COEFFICIENT (D) | 0.065 | 0.247 | 1.238 | 1.382 | 1.830 | 0.122 | -0.320 | -0.334 | -0.069 | -0.008 | 0.006 | 0.002 |
| 12-TH ORDER COEFFICIENT (E) | -0.060 | -0.873 | -1.633 | -1.676 | -2.401 | -0.102 | 0.245 | 0.255 | 0.020 | 0.001 | -0.001 | 0.000 |
| 14-TH ORDER COEFFICIENT (F) | 0.032 | 0.539 | 1.054 | 1.114 | 1.737 | 0.052 | -0.083 | -0.104 | -0.002 | 0.000 | 0.000 | 0.000 |
| 16-TH ORDER COEFFICIENT (G) | -0.008 | -0.134 | -0.279 | -0.317 | -0.537 | 0.000 | 0.000 | 0.017 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

| FOURTH EMBODIMENT | | | | | |
|---|---|---|---|---|---|
| F number= 2.00 | | TTL = 5.103 | | f = 4.327 | |
| SURFACE NUMBER | | RADIUS OF CURVATURE | THICKNESS/ DISTANCE | REFRACTIVE INDEX | ABBE NUMBER | FOCAL LENGTH |
| 0 | | Infinity | 0.0000 | | | |
| 1 | FIRST LENS | 1.9424 | 0.3416 | 1.547 | 56.1 | −677.554 |
| 2 | | 1.8121 | 0.0526 | | | |
| 3 | SECOND LENS | 1.6209 | 0.6128 | 1.547 | 56.1 | 2.800 |
| 4 | | −23.7446 | 0.0000 | | | |
| STOP | | Infinity | 0.0350 | | | |
| 5 | THIRD LENS | 6.3158 | 0.2393 | 1.657 | 21.5 | −5.988 |
| 6 | | 2.3886 | 0.4652 | | | |
| 7 | FOURTH LENS | −48.7298 | 0.3521 | 1.657 | 21.5 | 31.426 |
| 8 | | −14.5499 | 0.5826 | | | |
| 9 | FIFTH LENS | −1000.0000 | 0.5910 | 1.657 | 21.5 | −80.848 |
| 10 | | 56.1454 | 0.1000 | | | |
| 11 | SIXTH LENS | 2.3263 | 0.7103 | 1.537 | 55.7 | −10.783 |
| 12 | | 1.4826 | 0.2375 | | | |
| 13 | FILTER | Infinity | 0.2100 | 1.519 | 64.2 | |
| 14 | | Infinity | 0.5728 | | | |
| 15 | IMAGING PLANE | Infinity | 0.0000 | | | |

FIG. 15

| SURFACE NUMBER | 1 | 2 | 3 | 4 | 6 | 7 | 8 | 9 | 10 | 11 | 12 | 13 |
|---|---|---|---|---|---|---|---|---|---|---|---|---|
| RADIUS OF CURVATURE | 1.9424 | 1.8121 | 1.6209 | -22.7446 | 6.3158 | 2.3866 | -48.7296 | -14.5499 | -1000.0000 | 58.1454 | 2.3263 | 1.4826 |
| CONIC CONSTANT (K) | -1.229 | -3.693 | -1.354 | 0.000 | 35.734 | -9.668 | 0.000 | 0.000 | 7.860 | 0.949 | -3.249 | -6.103 |
| 4-TH ORDER COEFFICIENT (A) | -0.022 | -0.106 | -0.101 | -0.037 | -0.098 | 0.046 | -0.076 | -0.065 | 0.061 | 0.036 | -0.212 | -0.094 |
| 6-TH ORDER COEFFICIENT (B) | 0.000 | -0.005 | 0.080 | 0.032 | 0.160 | 0.042 | -0.059 | -0.084 | -0.171 | -0.074 | 0.103 | 0.037 |
| 8-TH ORDER COEFFICIENT (C) | -0.041 | -0.026 | -0.357 | -0.023 | -0.187 | 0.046 | 0.193 | 0.193 | 0.118 | 0.037 | -0.029 | -0.009 |
| 10-TH ORDER COEFFICIENT (D) | 0.069 | 0.574 | 1.065 | 0.101 | 0.600 | -0.188 | -0.277 | -0.215 | -0.060 | -0.010 | 0.005 | 0.002 |
| 12-TH ORDER COEFFICIENT (E) | -0.060 | -0.538 | -1.369 | -0.223 | -0.975 | 0.262 | 0.219 | 0.149 | 0.016 | 0.002 | 0.000 | 0.000 |
| 14-TH ORDER COEFFICIENT (F) | 0.029 | 0.213 | 0.864 | 0.219 | 0.833 | -0.114 | -0.073 | -0.052 | -0.002 | 0.000 | 0.000 | 0.000 |
| 16-TH ORDER COEFFICIENT (G) | -0.007 | -0.074 | -0.220 | -0.085 | -0.281 | 0.034 | 0.000 | 0.006 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 16

| FIFTH EMBODIMENT | | | | | |
|---|---|---|---|---|---|
| F number= | 1.98 | TTL = 5.102 | f = | 4.303 | |
| SURFACE NUMBER | | RADIUS OF CURVATURE | THICKNESS/ DISTANCE | REFRACTIVE INDEX | ABBE NUMBER | FOCAL LENGTH |
| 0 | | Infinity | 0.0000 | | | |
| 1 | FIRST LENS | 1.9460 | 0.3420 | 1.547 | 56.1 | -9275.74 |
| 2 | | 1.8244 | 0.0550 | | | |
| 3 | SECOND LENS | 1.6373 | 0.6212 | 1.547 | 56.1 | 2.816 |
| 4 | | -22.1759 | 0.0000 | | | |
| STOP | | Infinity | 0.0350 | | | |
| 5 | THIRD LENS | 6.2815 | 0.2319 | 1.657 | 21.5 | -6.016 |
| 6 | | 2.3914 | 0.4673 | | | |
| 7 | FOURTH LENS | -50.3385 | 0.3480 | 1.657 | 21.5 | 30.800 |
| 8 | | -14.4794 | 0.5871 | | | |
| 9 | FIFTH LENS | -1000.0000 | 0.5596 | 1.657 | 21.5 | -68.976 |
| 10 | | 47.5090 | 0.1000 | | | |
| 11 | SIXTH LENS | 2.3102 | 0.7249 | 1.537 | 55.7 | -11.437 |
| 12 | | 1.4947 | 0.2481 | | | |
| 13 | FILTER | Infinity | 0.2100 | 1.519 | 64.2 | |
| 14 | | Infinity | 0.5722 | | | |
| 15 | IMAGING PLANE | Infinity | 0.0000 | | | |

FIG. 19

| SURFACE NUMBER | 1 | 2 | 3 | 4 | 6 | 7 | 8 | 9 | 10 | 11 | 12 | 13 |
|---|---|---|---|---|---|---|---|---|---|---|---|---|
| RADIUS OF CURVATURE | 1.9460 | 1.8244 | 1.5273 | -22.1759 | 6.2815 | 2.3914 | -50.3386 | -14.4794 | -1000.3000 | 47.5090 | 2.3102 | 1.4947 |
| CONIC CONSTANT (K) | -1.219 | -3.612 | -1.358 | 0.000 | 35.923 | -9.531 | 0.000 | 0.000 | 7.860 | 0.949 | -3.154 | -5.239 |
| 4-TH ORDER COEFFICIENT (A) | -0.027 | -0.116 | -0.110 | -0.036 | -0.108 | 0.046 | -0.060 | -0.068 | 0.053 | 0.025 | -0.217 | -0.099 |
| 6-TH ORDER COEFFICIENT (B) | 0.022 | 0.062 | 0.159 | 0.025 | 0.196 | 0.037 | -0.045 | -0.086 | -0.169 | -0.067 | 0.109 | 0.035 |
| 8-TH ORDER COEFFICIENT (C) | -0.104 | -0.246 | -0.600 | 0.000 | -0.414 | 0.080 | 0.160 | 0.207 | 0.114 | 0.032 | -0.031 | -0.009 |
| 10-TH ORDER COEFFICIENT (D) | 0.171 | 0.748 | 1.541 | 0.063 | 0.924 | -0.246 | -0.220 | -0.240 | -0.056 | -0.008 | 0.005 | 0.001 |
| 12-TH ORDER COEFFICIENT (E) | -0.152 | -0.802 | -1.858 | -0.212 | -1.468 | 0.286 | 0.184 | 0.174 | 0.017 | 0.001 | -0.001 | 0.000 |
| 14-TH ORDER COEFFICIENT (F) | 0.073 | 0.511 | 1.122 | 0.229 | 1.211 | -0.153 | -0.063 | -0.064 | -0.002 | 0.000 | 0.000 | 0.000 |
| 16-TH ORDER COEFFICIENT (G) | -0.015 | -0.117 | -0.275 | -0.090 | -0.411 | 0.039 | 0.009 | 0.008 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 20

| SIXTH EMBODIMENT ||||||
|---|---|---|---|---|---|
| F number= 1.98 | | TTL = 5.102 | f = | 4.298 | |
| SURFACE NUMBER | RADIUS OF CURVATURE | THICKNESS/ DISTANCE | REFRACTIVE INDEX | ABBE NUMBER | FOCAL LENGTH |
| 0 | Infinity | 0.0000 | | | |
| 1 | 1.9643 | 0.3463 | 1.547 | 56.1 | -5064.53 |
| | FIRST LENS | | | | |
| 2 | 1.8407 | 0.0542 | | | |
| 3 | 1.6470 | 0.6215 | 1.547 | 56.1 | 2.818 |
| | SECOND LENS | | | | |
| 4 | -20.4974 | 0.0000 | | | |
| | STOP | Infinity | 0.0350 | | |
| 5 | 6.2862 | 0.2375 | 1.657 | 21.5 | -5.971 |
| | THIRD LENS | | | | |
| 6 | 2.3802 | 0.4655 | | | |
| 7 | -73.7933 | 0.3533 | 1.657 | 21.5 | 29.146 |
| | FOURTH LENS | | | | |
| 8 | -15.2397 | 0.5887 | | | |
| 9 | -1000.0000 | 0.5466 | 1.657 | 21.5 | -97.168 |
| | FIFTH LENS | | | | |
| 10 | 68.2516 | 0.1000 | | | |
| 11 | 2.3529 | 0.7182 | 1.537 | 55.7 | -10.996 |
| | SIXTH LENS | | | | |
| 12 | 1.5031 | 0.2531 | | | |
| 13 | Infinity | 0.2100 | 1.519 | 64.2 | |
| | FILTER | | | | |
| 14 | Infinity | 0.5722 | | | |
| 15 | IMAGING PLANE | Infinity | 0.0000 | | |

FIG. 23

| SURFACE NUMBER | 1 | 2 | 3 | 4 | 6 | 7 | 8 | 9 | 10 | 11 | 12 | 13 |
|---|---|---|---|---|---|---|---|---|---|---|---|---|
| RADIUS OF CURVATURE | 1.9643 | 1.9407 | 1.6470 | -20.4974 | 6.7862 | 2.3802 | -72.7933 | -15.2397 | -1000.0000 | 68.2516 | 2.3529 | 1.5031 |
| CONIC CONSTANT (K) | -1.215 | -3.525 | -1.335 | 0.000 | 35.919 | -9.445 | 0.000 | 0.000 | 7.860 | 0.949 | -3.175 | -5.504 |
| 4-TH ORDER COEFFICIENT (A) | -0.028 | -0.117 | -0.109 | -0.038 | -0.100 | 0.047 | -0.079 | -0.089 | 0.054 | 0.027 | -0.210 | -0.061 |
| 6-TH ORDER COEFFICIENT (B) | 0.027 | 0.069 | 0.153 | 0.040 | 0.169 | 0.033 | -0.030 | -0.076 | -0.164 | -0.068 | 0.104 | 0.030 |
| 8-TH ORDER COEFFICIENT (C) | -0.117 | -0.268 | -0.578 | -0.057 | -0.413 | 0.098 | 0.128 | 0.193 | 0.110 | 0.033 | -0.030 | -0.008 |
| 10-TH ORDER COEFFICIENT (D) | 0.195 | 0.810 | 1.503 | 0.180 | 0.896 | -0.278 | -0.179 | -0.227 | -0.053 | -0.009 | 0.005 | 0.001 |
| 12-TH ORDER COEFFICIENT (E) | -0.175 | -0.992 | -1.834 | -0.349 | -1.413 | 0.308 | 0.142 | 0.168 | 0.016 | 0.001 | -0.001 | 0.000 |
| 14-TH ORDER COEFFICIENT (F) | 0.084 | 0.575 | 1.100 | 0.321 | 1.190 | -0.153 | -0.049 | -0.064 | -0.002 | 0.000 | 0.000 | 0.000 |
| 16-TH ORDER COEFFICIENT (G) | -0.017 | -0.132 | -0.269 | -0.114 | -0.402 | 0.035 | 0.008 | 0.009 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 24

OPTICAL SYSTEM

CROSS-REFERENCE TO RELATED APPLICATION

This application claims the priority and benefit of Korean Patent Application No. 10-2015-0112495, filed on Aug. 10, 2015 with the Korean Intellectual Property Office, the disclosure of which is incorporated herein by reference.

BACKGROUND

1. Field

The following description relates to an optical system including lenses having refractive power.

2. Description of Related Art

Over the years, camera modules have gradually been miniaturized. In addition, camera module performance has gradually improved. As an example, pixels of an image sensor have become small enough to enable realization of high resolution.

Typically, an optical system of a small camera module includes four lenses. However, it is difficult for the optical system including the four lenses to implement a clear image. Therefore, development of an optical system including five or more lenses is needed in order to enable realization of a clear image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical system, including: a first lens including a negative refractive power and a convex object-side surface; a second lens; a third lens including a negative refractive power and a convex object-side surface; a fourth lens; a fifth lens including a negative refractive power; and a sixth lens including a negative refractive power and including an inflection point on an image-side surface thereof, wherein the first to sixth lenses are sequentially disposed from an object toward an imaging plane.

V1, an Abbe number of the first lens and, V3, an Abbe number of the third lens may satisfy 25<V1−V3<45.

f, an overall focal length of the optical system and, f2, a focal length of the second lens may satisfy 0.3<f2/f<1.5.

f, an overall focal length of the optical system and, TTL, a distance from the object-side surface of the first lens to the imaging plane may satisfy TTL/f<1.5.

f, an overall focal length of the optical system and, r11, a radius of curvature of an image-side surface of the fifth lens may satisfy 1.0<r11/f.

The second lens has a positive refractive power.

The fourth lens has a positive refractive power.

In accordance with an embodiment, there is provided an optical system, including: a first lens including a negative refractive power and a convex object-side surface; a second lens including a convex object-side surface and a convex image-side surface; a third lens; a fourth lens including a concave object-side surface; a fifth lens including a negative refractive power; and a sixth lens may include an inflection point formed on an image-side surface thereof, wherein the first to sixth lenses are sequentially disposed from an object toward an imaging plane.

The first lens may include a concave image-side surface.

The third lens may include a convex object-side surface and a concave image-side surface.

The third lens may have a negative refractive power.

The fourth lens may include a convex image-side surface.

The fourth lens may have a positive refractive power.

The fifth lens may include a concave image-side surface.

The sixth lens may include a convex object-side surface and the image-side surface thereof is concave.

The sixth lens has a negative refractive power.

In accordance with another embodiment, there is provided an optical system, including: a first lens including a convex object-side surface and a concave image-side surface; a second lens including a convex object-side surface and a convex image-side surface; a third lens including a convex object-side surface and a concave image-side surface; a fourth lens including a concave object-side surface and a convex image-side surface; a fifth lens including a concave object-side surface and a concave image-side surface; and a sixth lens, wherein the second lens has a same refractive power as a refractive power of the first lens, the third lens, the fourth lens, and the fifth lens have a refractive power higher than the refractive powers of the first and second lenses, and the sixth lens has a refractive power lower than the refractive powers of the first and second lenses.

f, an overall focal length of the optical system and, f1, a focal length of the first lens may satisfy f1/f<0.

f, an overall focal length of the optical system, and r7 a radius of curvature of the image-side surface of the third lens may satisfy 0.3<r7/f<1.4.

FOV, a field of view of the optical system may satisfy 74<FOV.

Upper and lower ends of the fifth lens extend horizontally towards an object side, parallel to upper and lower portions of the first through fourth lenses.

The object-side surface of the fifth lens is concave in a paraxial region and gradually flattens at edge portions thereof.

The first lens may include a negative refractive power, the second lens may include a positive refractive power, the third lens may include a negative refractive power, the fourth lens may include a positive refractive power, the fifth lens may include a negative refractive power, and the sixth lens may include a negative refractive power.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of the optical system according to the first embodiment;

FIG. 4 is a table representing aspherical characteristics of the optical system, according to the first embodiment;

FIG. 7 is a table representing characteristics of the optical system, according to the second embodiment;

FIG. 8 is a table representing aspherical characteristics of the optical system, according to the second embodiment;

FIG. 11 is a table representing characteristics of the optical system, according to the third embodiment;

FIG. 12 is a table representing aspherical characteristics of the optical system, according to the third embodiment;

FIG. 15 is a table representing characteristics of the optical system, according to the fourth embodiment;

FIG. 16 is a table representing aspherical characteristics of the optical system, according to the fourth embodiment;

FIG. 19 is a table representing characteristics of the optical system, according to the fifth embodiment;

FIG. 20 is a table representing aspherical characteristics of the optical system, according to the fifth embodiment;

FIG. 23 is a table representing characteristics of the optical system, according to the sixth embodiment; and FIG. 24 is a table representing aspherical characteristics of the optical system, according to the sixth embodiment.

Figure 1:
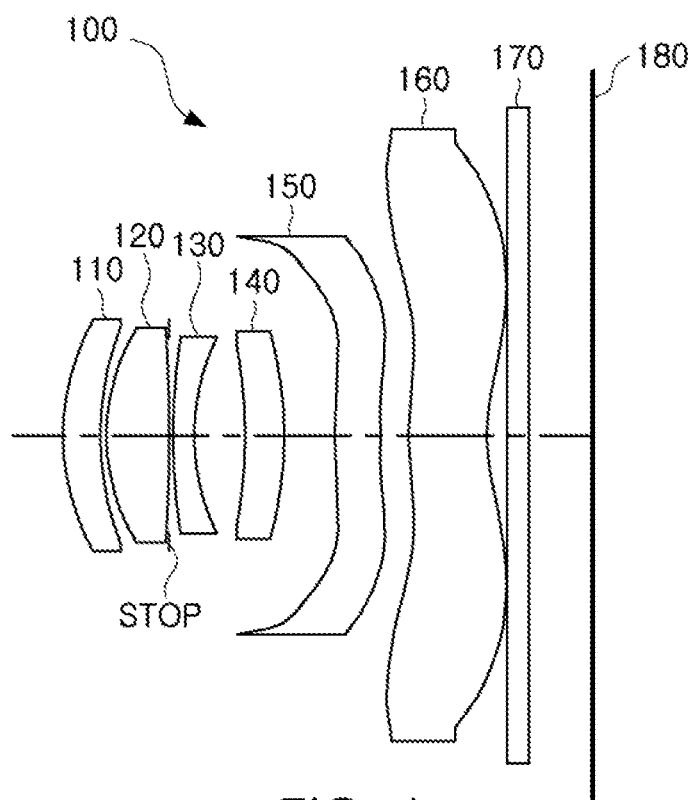
FIG. 1 is a view of an optical system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

Example embodiments of the present disclosure will now be described in detail with reference to the accompanying drawings.

In addition, a surface of each lens closest to an object is referred to as a first surface or an object-side surface, and a surface of each lens closest to an imaging surface is referred to as a second surface or an image-side surface. Further, all numerical values of radii of curvature, thicknesses/distances, TTLs, and other parameters of the lenses are represented in millimeters (mm).

A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

In addition, in an embodiment, shapes of lenses are described and illustrated in relation to optical axis portions of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, and a sixth lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

In the optical system, according to embodiments, the first to sixth lenses are formed of materials including glass, plastic or other similar types of polycarbonate materials. In another embodiment, at least one of the first through sixth lenses is formed of a material different from the materials forming the other first through sixth lenses.

The first lens has a refractive power. As an example, the first lens has a negative refractive power. An object-side surface of the first lens is convex. The first lens has an aspherical surface. As an example, both of the object-side surface and an image-side surface of the first lens are aspherical. The first lens is formed of plastic. However, a material of the first lens is not limited to plastic.

The second lens has a refractive power, such as a positive refractive power or a negative refractive power. Both of an object-side surface and an image-side surface of the second lens are convex. The second lens has an aspherical surface. As an example, both of the object-side surface and the image-side surface of the second lens are aspherical. The second lens is formed of plastic. However, a material of the second lens is not limited to plastic.

The third lens has a refractive power. As an example, the third lens may have negative refractive power. An object-side surface of the third lens is convex. The third lens has an aspherical surface. As an example, both of the object-side surface and an image-side surface of the third lens are aspherical. The third lens is formed of plastic. However, a material of the third lens is not limited to plastic.

The fourth lens may have refractive power, such as a positive refractive power or a negative refractive power. An object-side surface of the fourth lens is concave. The fourth lens has an aspherical surface. As an example, both of an object-side surface and the image-side surface of the fourth lens are aspherical. The fourth lens is formed of plastic. However, a material of the fourth lens is not limited to plastic.

The fifth lens has a refractive power. As an example, the fifth lens has a negative refractive power. An image-side surface of the fifth lens is concave. The fifth lens has an aspherical surface. As an example, both of an object-side surface and the image-side surface of the fifth lens is aspherical. The fifth lens has an inflection point. As an example, one or more inflection points are formed on the image-side surface of the fifth lens. The fifth lens is formed of plastic. However, a material of the fifth lens is not limited to plastic.

The sixth lens has a refractive power. As an example, the sixth lens has a negative refractive power. An image-side surface of the sixth lens is concave. The sixth lens has an aspherical surface. As an example, both of an object-side surface and the image-side surface of the sixth lens are aspherical. The sixth lens has an inflection point. As an example, one or more inflection points are formed on the image-side surface of the sixth lens. The sixth lens is formed of plastic. However, a material of the sixth lens is not limited to plastic.

A person of ordinary skill in the relevant art will appreciate that each of the first through six lenses may be configured in an opposite refractive power from the configuration described above. For example, in an alternative configuration, the first lens has a positive refractive power, the second lens has a negative refractive power, the third lens has a positive refractive power, the fourth lens has a negative refractive power, the fifth lens has a positive refractive power, and the sixth lens has a positive refractive power.

The optical system includes a filter and an image sensor. The filter is disposed between the sixth lens and the image sensor. The filter may filter an infrared component from incident light refracted through the first to sixth lenses. The image sensor is disposed behind the filter, and converts the incident light refracted through the first to sixth lenses into electrical signals.

The optical system includes a stop. The stop adjusts an amount of light incident to the first to sixth lenses. As an example, the stop is disposed between the second lens and the third lens to adjust an amount to incident light.

The optical system satisfies the following Conditional Expression 1:

$$f1/f<0. \quad \text{[Conditional Expression 1]}$$

In an example, f is an overall focal length of the optical system, and f1 is a focal length of the first lens. The Conditional Expression 1 represents or defines a condition for limiting a magnitude of refractive power of the first lens to overall refractive power of the optical system. As an example, in a case in which f1/f is outside of an upper limit value of the Conditional Expression 1, the first lens may not maintain the negative refractive power.

The optical system satisfies one or more of the following Conditional Expressions 2 through 4:

$$V1-V2<25 \quad \text{[Conditional Expression 2]}$$

$$25<V1-V3<45 \quad \text{[Conditional Expression 3]}$$

$$25<V1-V5<45. \quad \text{[Conditional Expression 4]}$$

In one embodiment, V1 is an Abbe number of the first lens, V2 is an Abbe number of the second lens, V3 is an Abbe number of the third lens, and V5 is an Abbe number of the fifth lens. The Conditional Expressions 2 through 4 indicate limit conditions for correction chromatic aberration of the optical system. As an example, in a case in which V1-V2, V1-V3, and V1-V5 are outside of numerical ranges of the Conditional Expressions 2 through 4, respectively, the optical system has significantly great chromatic aberration, in such a manner that it is difficult to use the optical system in a camera module that needs high resolution.

The optical system satisfies the following Conditional Expression 5:

$$0.3<f2/f<1.5. \quad \text{[Conditional Expression 5]}$$

In an example, f is the overall focal length of the optical system, and f2 is a focal length of the second lens. The Conditional Expression 5 represents or defines a condition for limiting a magnitude of refractive power of the second lens to the overall refractive power of the optical system. As an example, in a case in which f2/f is outside of a lower limit value of the Conditional Expression 5, the second lens has significantly great refractive power, in such a manner that it is difficult to correct spherical aberration. As another example, in a case in which f2/f is outside of an upper limit value of the Conditional Expression 5, the second lens has significantly low refractive power, which is advantageous to correct spherical aberration, but makes miniaturization of the optical system difficult.

The optical system satisfies the following Conditional Expression 6:

$$-3.0<f3/f<-1.0.\qquad\text{[Conditional Expression 6]}$$

In one example, f is the overall focal length of the optical system, and f3 is a focal length of the third lens. The Conditional Expression represents or defines a condition for limiting a magnitude of refractive power of the third lens to the overall refractive power of the optical system. As an example, in a case in which f3/f is outside of a lower limit value of the Conditional Expression 6, the third lens has significantly great refractive power making it difficult to correct spherical aberration. As another example, in a case in which f3/f is outside of an upper limit value of the Conditional Expression 6, the third lens has significantly low refractive power, which is advantageous in correcting spherical aberration, but makes miniaturization of the optical system difficult.

The optical system satisfies the following Conditional Expression 7:

$$3.0<|f4/f|.\qquad\text{[Conditional Expression 7]}$$

In an embodiment, f is the overall focal length of the optical system, and f4 is a focal length of the fourth lens. The Conditional Expression 7 represents or defines a condition for limiting a magnitude of refractive power of the fourth lens to the overall refractive power of the optical system. As an example, in a case in which f4/f is outside of a lower limit value of the Conditional Expression 7, the fourth lens has significantly great refractive power making it difficult to correct spherical aberration.

The optical system satisfies the following Conditional Expression 8:

$$f5/f<-10.\qquad\text{[Conditional Expression 8]}$$

In one example, f is the overall focal length of the optical system, and f5 is a focal length of the fifth lens. The Conditional Expression 8 represents or defines a condition for limiting a magnitude of refractive power of the fifth lens to the overall refractive power of the optical system. As an example, in a case in which f5/f is outside of an upper limit value of the Conditional Expression 8, the fifth lens has significantly great refractive power making it difficult to correct spherical aberration.

The optical system satisfies the following Conditional Expression 9:

$$TTL/f<1.5.\qquad\text{[Conditional Expression 9]}$$

In an example, f is the overall focal length of the optical system, and TTL is a distance from the object-side surface of the first lens to an imaging plane. The Conditional Expression 9 represents or defines a condition for miniaturizing the optical system. As an example, in a case in which TTL/f is outside of an upper limit value of the Conditional Expression 9, it is difficult to mount the optical system in a small portable terminal.

The optical system satisfies the following Conditional Expression 10:

$$f1/f2<0.\qquad\text{[Conditional Expression 10]}$$

In an embodiment, f1 is the focal length of the first lens, and f2 is the focal length of the second lens. The Conditional Expression 10 represents or defines a condition for limiting a ratio of refractive power between the first lens and the second lens. As an example, in a case in which f1/f2 is outside of an upper limit value of the Conditional Expression 10, refractive power of the first lens or the second lens is significantly great making it difficult to correct aberration.

The optical system satisfies the following Conditional Expression 11:

$$-1.2<f2/f3<0.\qquad\text{[Conditional Expression 11]}$$

In one example, f2 is the focal length of the second lens, and f3 is the focal length of the third lens. The Conditional Expression 11 represents or defines a condition for limiting a ratio of refractive power between the second lens and the third lens. As an example, in a case in which f2/f3 is outside of a numerical range of the Conditional Expression 11, refractive power of the second lens or the third lens is significantly great making it difficult to correct aberration.

The optical system satisfies the following Conditional Expression 12:

$$BFL/f<0.5.\qquad\text{[Conditional Expression 12]}$$

In an embodiment, f is the overall focal length of the optical system, and BFL is a distance from the object-side surface of the sixth lens to the imaging plane. The Conditional Expression 12 represents or defines a condition for miniaturizing the optical system. As an example, in a case in which BFL/f is outside of an upper limit value of the Conditional Expression 12, it is difficult to miniaturize the optical system.

The optical system satisfies the following Conditional Expression 13:

$$D2/f<0.1.\qquad\text{[Conditional Expression 13]}$$

In one embodiment, f is the overall focal length of the optical system, and D2 is a distance from the image-side surface of the first lens to the object-side surface of the second lens. The Conditional Expression 13 represents or defines a condition for improving longitudinal chromatic aberration characteristics. As an example, in a case in which D2/f is outside of an upper limit value of the Conditional Expression 13, the first lens and the second lens may have deteriorated longitudinal chromatic aberration characteristics.

The optical system satisfies the following Conditional Expression 14:

$$0.3<r7/f<1.4.\qquad\text{[Conditional Expression 14]}$$

In an example, f is the overall focal length of the optical system, and r7 is a radius of curvature of the image-side surface of the third lens. The Conditional Expression 14 represents or defines a condition for limiting refractive power of the third lens. As an example, in a case in which r7/f is outside of a numerical range of the Conditional Expression 14, it is not easy to manufacture the third lens, and it is difficult to secure the required refractive power.

The optical system satisfies the following Conditional Expression 15:

$$1.0<r11/f.\qquad\text{[Conditional Expression 15]}$$

In one example, f is the overall focal length of the optical system, and r11 is a radius of curvature of the image-side surface of the fifth lens. The Conditional Expression 15 represents or defines a condition for limiting refractive power of the fifth lens. As an example, in a case in which r11/f is outside of a numerical range of the Conditional Expression 15, it is not easy to manufacture the fifth lens, and it is difficult to secure the required refractive power.

The optical system satisfies one or more of the following Conditional Expressions 16 and 17:

74<FOV   [Conditional Expression 16]

F number<2.1.   [Conditional Expression 17]

In a further example, FOV is a field of view of the optical system.

The optical system configured as described above realizes a camera module having a wide field of view and high resolution.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

In a further alternative embodiment, two or more of the lenses of the first to sixth lenses may be configured as a group and in operative connection or contact with another lens. For instance, the first, second, and third lenses may be in contact with each other as a first group lens, while the fourth, fifth, and sixth lenses are configured separate from each other and from the first group lens. In the alternative, the first, second, and third lenses may be in contact with each other as a first group lens, the fourth and the fifth lenses may be in contact with each other as a second group lens, and the sixth lens is configured separate from the first and second group lenses.

Next, several embodiments will be described.

An optical system, according to a first embodiment, will be described with reference to FIG. 1.

The optical system 100, according to an embodiment, includes first to sixth lenses 110 to 160. The first to sixth lenses 110 to 160 are sequentially disposed from an object toward an imaging plane.

The first lens 110 has a negative refractive power. An object-side surface of the first lens 110 is convex, and an image-side surface thereof is concave. The first lens 110 has an aspherical shape. As an example, both of the object-side surface and the image-side surface of the first lens 110 are aspherical. The first lens 110 may be formed of a material having a refractive index of 1.547. A focal length of the first lens 110 may be −47457.1 mm.

The second lens 120 has a positive refractive power. An object-side surface of the second lens 120 is convex, and an image-side surface thereof is convex. The second lens 120 has an aspherical shape. As an example, both of the object-side surface and the image-side surface of the second lens 120 are aspherical. The second lens 120 is formed of a material that is substantially the same as or similar to that of the first lens. As an example, the second lens 120 has a refractive index of 1.547, which is the same as that of the first lens. A focal length of the second lens 120 may be 2.788 mm.

The third lens 130 has a negative refractive power. An object-side surface of the third lens 130 is convex, and an image-side surface thereof is concave. The third lens 130 has an aspherical shape. As an example, both of the object-side surface and the image-side surface of the third lens 130 are aspherical. The third lens 130 has a refractive index higher than the refractive powers of the first and second lenses. As an example, a refractive index of the third lens 130 may be 1.657, which is higher than the refractive indices of the first and second lenses. A focal length of the third lens 130 may be −5.794 mm.

The fourth lens 140 has a positive refractive power. An object-side surface of the fourth lens 140 is concave, and an image-side surface thereof is convex. The fourth lens 140 has an aspherical shape. As an example, both of the object-side surface and the image-side surface of the fourth lens 140 are aspherical. The fourth lens 140 has a refractive index higher than the refractive indices of the first and second lenses. As an example, a refractive index of the fourth lens 140 may be 1.657, which is higher than the refractive indices of the first and second lenses. A focal length of the fourth lens 140 may be 158.832 mm.

The fifth lens 150 has a negative refractive power. An object-side surface of the fifth lens 150 is convex, and an image-side surface thereof is concave. The fifth lens 150 has an aspherical shape. For example, the object-side surface of the fifth lens 150 is convex in the paraxial region, and the image-side surface of the fifth lens 150 is concave in the paraxial region. As an example, both of the object-side surface and the image-side surface of the fifth lens 150 are aspherical. An inflection point is formed on the fifth lens 150. As an example, one or more inflection points are formed on the image-side surface of the fifth lens 150. The fifth lens 150 has a refractive index higher than the refractive indices of the first and second lenses. As an example, a refractive index of the fifth lens 150 may be 1.657, which is higher than the refractive indices of the first and second lenses. A focal length of the fifth lens 150 may be −176353.3 mm.

The sixth lens 160 has a negative refractive power. An object-side surface of the sixth lens 160 is convex, and an image-side surface thereof is concave. The sixth lens 160 may have an aspherical shape. For example, the object-side surface of the sixth lens 16 is convex in the paraxial region, and the image-side surface of the sixth lens 160 is concave in the paraxial region. As an example, both of the object-side surface and the image-side surface of the sixth lens 160 are aspherical. An inflection point is formed on the sixth lens 160. As an example, one or more inflection points are formed on the object-side surface and the image-side surface of the sixth lens 160. The sixth lens 160 has a low refractive index. As an example, a refractive index of the sixth lens 160 may be 1.537, which is lower than the refractive indices of the first and second lenses. A focal length of the sixth lens 160 may be −13.349 mm.

The optical system 100 includes a filter 170 and an image sensor 180. The filter 170 is disposed adjacently to the image-side surface of the sixth lens 160. The filter 170 has a substantially flat plate. The filter 170 filters infrared rays from light refracted from the sixth lens 160.

The image sensor 180 is disposed behind the filter 170. The image sensor 180 has a predetermined size. As an example, a distance (IMH HT) (see FIG. 2) from an intersection point between an imaging plane of the image sensor 180 and an optical axis to a diagonal corner of the image sensor 180 may be 3.50 mm.

The optical system 100 includes a stop STOP. The stop STOP is disposed between the second lens and the third lens. However, a person skill in the art will appreciate that the stop ST may be positioned in between two of the lenses 110 to 160.

Figure 2:
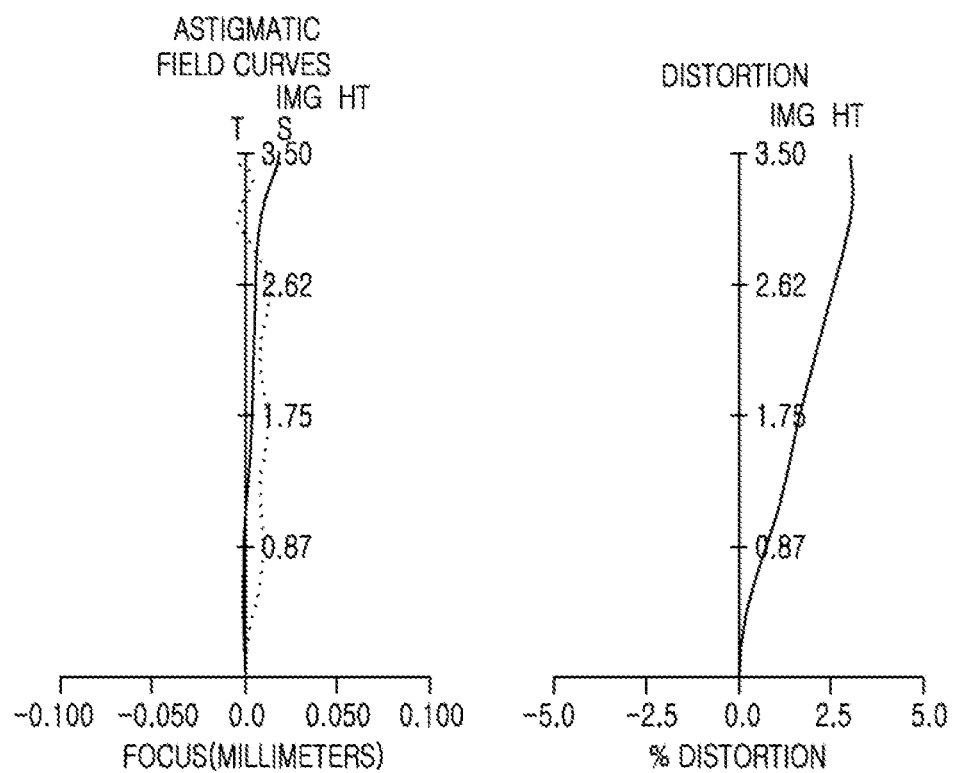
FIG. 2 illustrates graphs having curves representing aberration of the optical system according to the first embodiment.

The optical system 100 configured as described above represents aberration characteristics and optical characteristics as illustrated in FIGS. 2 and 3. As an example, an F number of the optical system 100, according to an embodiment, is 2.09, an overall length (TTL), which is a distance from the object-side surface of the first lens to the imaging plane of the optical system 100, is 5.211 mm, and an overall focal length of the optical system 100 is 4.492 mm. For reference, FIG. 4 is a table representing aspherical coefficients of the optical system 100.

Figure 5:
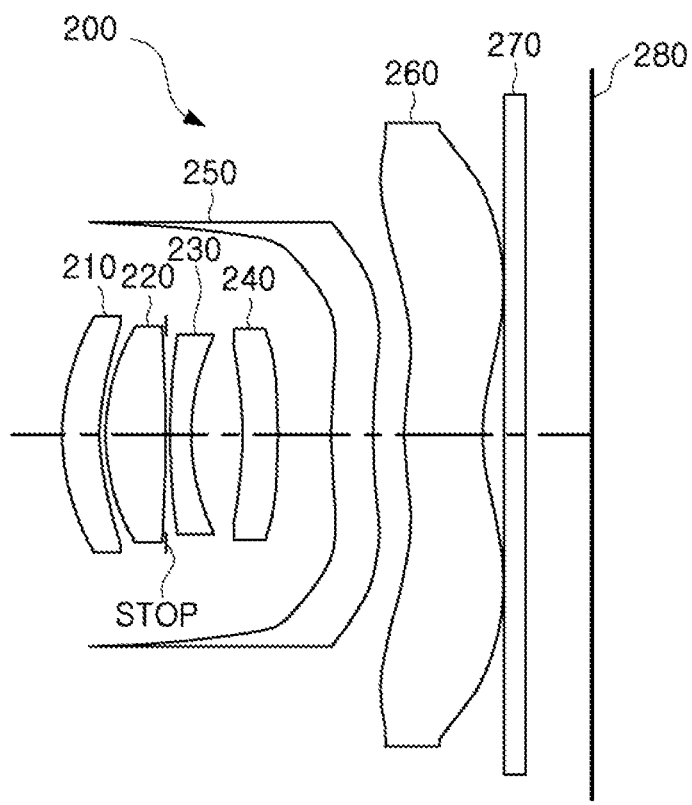
FIG. 5 is a view of an optical system, according to a second embodiment.

An optical system, according to a second embodiment, will be described with reference to FIG. 5.

The optical system 200, according to an embodiment, includes first to sixth lenses 210 to 260. The first to sixth lenses 210 to 260 are sequentially disposed from an object toward an imaging plane.

The first lens 210 has a negative refractive power. An object-side surface of the first lens 210 is convex, and an image-side surface thereof is concave. The first lens 210 has an aspherical shape. As an example, both of the object-side surface and the image-side surface of the first lens 210 are aspherical. The first lens 210 may be formed of a material having a refractive index of 1.547. A focal length of the first lens 210 may be −40047.4 mm.

The second lens 220 has a positive refractive power. An object-side surface of the second lens 220 is convex, and an image-side surface thereof is convex. The second lens 220 has an aspherical shape. As an example, both of the object-side surface and the image-side surface of the second lens 220 are aspherical. The second lens 220 is formed of a material that is substantially the same as or similar to that of the first lens. As an example, the second lens 220 has a refractive index of 1.547, which is the same as that of the first lens. A focal length of the second lens 220 may be 2.780 mm.

The third lens 230 has a negative refractive power. An object-side surface of the third lens 230 is convex, and an image-side surface thereof is concave. The third lens 230 has an aspherical shape. As an example, both of the object-side surface and the image-side surface of the third lens 230 are aspherical. The third lens 230 has a refractive index higher than the refractive indices of the first and second lenses. As an example, a refractive index of the third lens 230 may be 1.657, which is higher than the refractive indices of the first and second lenses. A focal length of the third lens 230 may be −5.758 mm.

The fourth lens 240 has a positive refractive power. An object-side surface of the fourth lens 240 is concave, and an image-side surface thereof is convex. The fourth lens 240 has an aspherical shape. As an example, both of the object-side surface and the image-side surface of the fourth lens 240 are aspherical. The fourth lens 240 has a refractive index higher than the refractive indices of the first and second lenses. As an example, refractive index of the fourth lens 240 may be 1.657, which is higher than the refractive indices of the first and second lenses. A focal length of the fourth lens 240 may be 69.588 mm.

The fifth lens 250 has a negative refractive power. An object-side surface of the fifth lens 250 is convex, and an image-side surface thereof is concave. The fifth lens 250 has an aspherical shape. As an example, both of the object-side surface and the image-side surface of the fifth lens 250 are aspherical. An inflection point is formed on the fifth lens 250. As an example, one or more inflection points may be formed on the image-side surface of the fifth lens 250. The fifth lens 250 has a refractive index higher than the refractive indices of the first and second lenses. As an example, a refractive index of the fifth lens 250 may be 1.657, which is higher than the refractive indices of the first and second lenses. A focal length of the fifth lens 250 may be −405.09 mm. In accordance with an embodiment, as shown in FIG. 5, upper and lower ends of the fifth lens 250 extend horizontally towards the object side, parallel to upper and lower portions of the first through fourth lenses 210 through 240, without contacting the upper and lower portions of the first through fourth lenses 210 through 240.

The sixth lens 260 has a negative refractive power. An object-side surface of the sixth lens 260 is convex, and an image-side surface thereof is concave. The sixth lens 260 has an aspherical shape. As an example, both of the object-side surface and the image-side surface of the sixth lens 260 are aspherical. An inflection point is formed on the sixth lens 260. As an example, one or more inflection points are formed on the object-side surface and the image-side surface of the sixth lens 260. The sixth lens 260 has a low refractive index. As an example, a refractive index of the sixth lens 260 may be 1.537, which is lower than the refractive indices of the first and second lenses. A focal length of the sixth lens 260 may be −13.722 mm.

The optical system 200 includes a filter 270 and an image sensor 280. The filter 270 is disposed adjacently to the image-side surface of the sixth lens 260. The filter 270 has a substantially flat plate. The filter 270 filters infrared rays from light refracted from the sixth lens 260.

The image sensor 280 is disposed behind the filter 270. The image sensor 280 has a predetermined size. As an example, a distance (IMH HT) (see FIG. 2) from an intersection point between an imaging plane of the image sensor 280 and an optical axis to a diagonal corner of the image sensor 280 is 3.50 mm.

The optical system 200 includes a stop STOP. The stop STOP is disposed between the second lens and the third lens.

Figure 6:
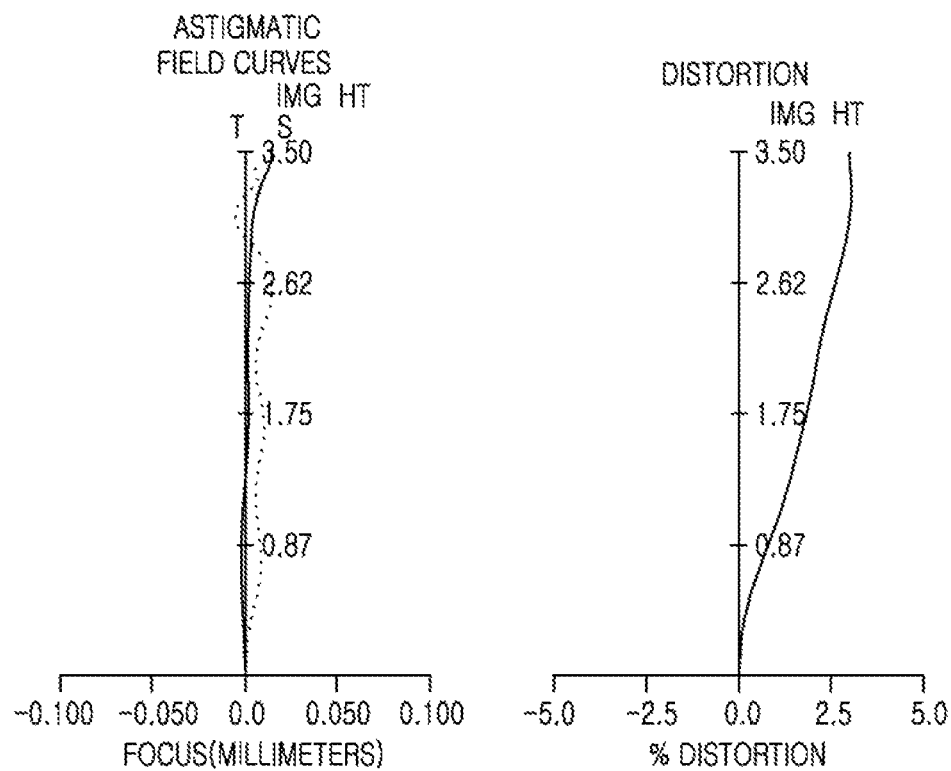
FIG. 6 illustrates graphs having curves representing aberration of the optical system, according to the second embodiment.

The optical system 200 configured as described above may represent aberration characteristics and optical characteristics as illustrated in FIGS. 6 and 7. As an example, an F number of the optical system 200, according to an embodiment may be 2.07, an overall length (TTL), which is a distance from the object-side surface of the first lens to the imaging plane of the optical system 200, is 5.104 mm, and an overall focal length of the optical system 200 is 4.402 mm. For reference, FIG. 8 is a table representing aspherical coefficients of the optical system 200.

Figure 9:
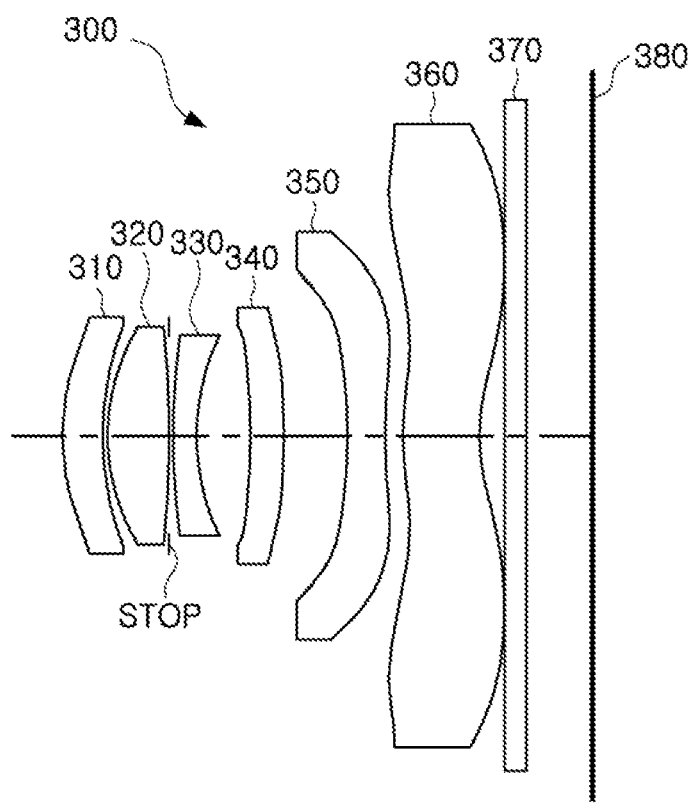
FIG. 9 is a view of an optical system, according to a third embodiment.

An optical system, according to a third embodiment, will be described with reference to FIG. 9.

The optical system 300, according to an embodiment, includes first to sixth lenses 310 to 360. The first to sixth lenses 310 to 360 are sequentially disposed from an object toward an imaging plane.

The first lens 310 has a negative refractive power. An object-side surface of the first lens 310 is convex, and an image-side surface thereof is concave. The first lens 310 has an aspherical shape. As an example, both of the object-side surface and the image-side surface of the first lens 310 are aspherical. The first lens 310 may be formed of a material having a refractive index of 1.547. A focal length of the first lens 310 may be −95.513 mm.

The second lens 320 has a positive refractive power. An object-side surface of the second lens 320 is convex, and an image-side surface thereof is convex. The second lens 320 has an aspherical shape. As an example, both of the object-side surface and the image-side surface of the second lens 320 are aspherical. The second lens 320 is formed of a material that is substantially the same as or similar to that of the first lens. As an example, the second lens 320 has a refractive index of 1.547, which is the same as that of the first lens. A focal length of the second lens 320 may be 2.716 mm.

The third lens 330 has a negative refractive power. An object-side surface of the third lens 330 is convex, and an image-side surface thereof is concave. The third lens 330 has an aspherical shape. As an example, both of the object-side surface and the image-side surface of the third lens 330 are aspherical. The third lens 330 has a refractive index higher than the refractive indices of the first and second lenses. As an example, a refractive index of the third lens 330 is 1.657, which is higher than the refractive indices of the first and second lenses. A focal length of the third lens 330 may be −6.192 mm.

The fourth lens 340 has a positive refractive power. An object-side surface of the fourth lens 340 is concave, and an image-side surface thereof is convex. The fourth lens 340 has an aspherical shape. As an example, both of the object-side surface and the image-side surface of the fourth lens 340 are aspherical. The fourth lens 340 may have a refractive index higher than the refractive indices of the first and second lenses. As an example, a refractive index of the fourth lens 340 is 1.657, which is higher than the refractive indices of the first and second lenses. A focal length of the fourth lens 340 may be 62.408 mm.

The fifth lens 350 has a negative refractive power. An object-side surface of the fifth lens 350 is concave, and an image-side surface thereof is concave. The fifth lens 350 has an aspherical shape. As an example, both of the object-side surface and the image-side surface of the fifth lens 350 are aspherical. An inflection point is formed on the fifth lens 350. As an example, one or more inflection points are formed on the image-side surface of the fifth lens 350. The fifth lens 350 has a refractive index higher than the refractive indices of the first and second lenses. As an example, a refractive index of the fifth lens 350 may be 1.657, which is higher than the refractive indices of the first and second lenses. A focal length of the fifth lens 350 may be −196.150 mm. In one example, the object-side surface of the fifth lens 350 is concave in a paraxial region and gradually flattens at edge portions thereof.

The sixth lens 360 has a negative refractive power. An object-side surface of the sixth lens 360 is convex, and an image-side surface thereof is concave. The sixth lens 360 has an aspherical shape. As an example, both of the object-side surface and the image-side surface of the sixth lens 360 are aspherical. An inflection point is formed on the sixth lens 360. As an example, one or more inflection points are formed on the object-side surface and the image-side surface of the sixth lens 360. The sixth lens 360 has a low refractive index. As an example, refractive index of the sixth lens 360 may be 1.537, which is lower than the refractive indices of the first and second lenses. A focal length of the sixth lens 360 may be −11.896 mm.

The optical system 300 includes a filter 370 and an image sensor 380. The filter 370 is disposed adjacently to the image-side surface of the sixth lens 360. The filter 370 has a substantially flat plate. The filter 370 filters an infrared ray from light refracted from the sixth lens 360.

The image sensor 380 is disposed behind the filter 370. The image sensor 380 has a predetermined size. As an example, a distance (IMH HT) (see FIG. 2) from an intersection point between an imaging plane of the image sensor 380 and an optical axis to a diagonal corner of the image sensor 380 may be 3.50 mm.

The optical system 300 includes a stop STOP. The stop STOP is disposed between the second lens and the third lens.

Figure 10:
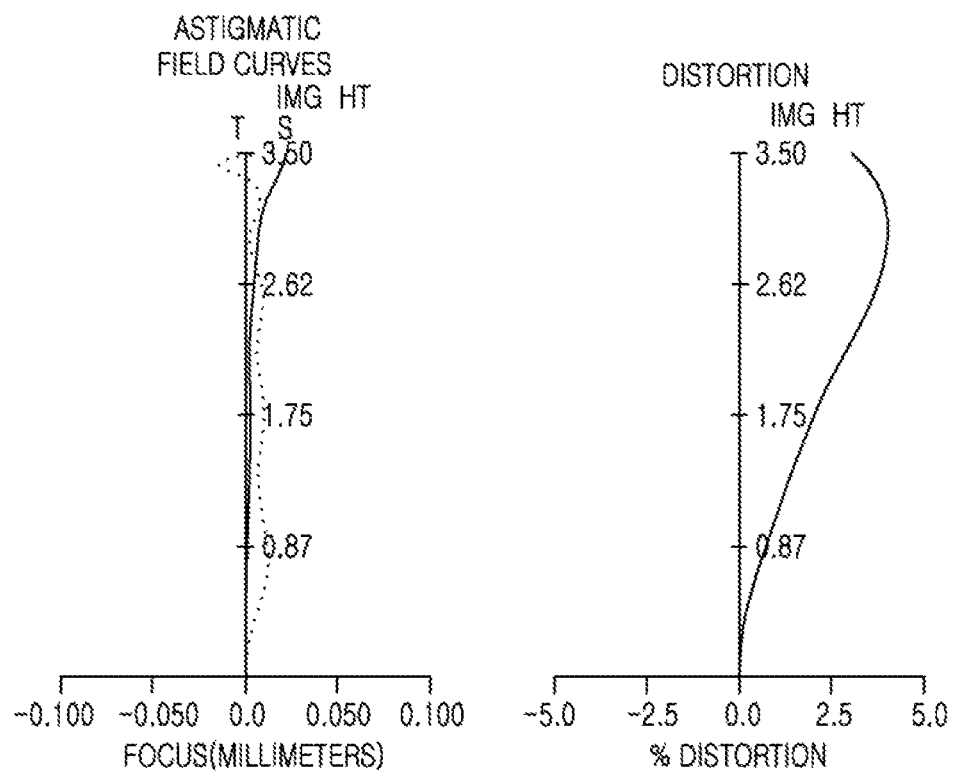
FIG. 10 illustrates graphs having curves representing aberration of the optical system, according to the third embodiment.

The optical system 300 configured as described above may represent aberration characteristics and optical characteristics as illustrated in FIGS. 10 and 11. As an example, an F number of the optical system 300, according to an embodiment, is 2.09, an overall length (TTL), which is a distance from the object-side surface of the first lens to the imaging plane of the optical system 300, is 5.104 mm, and an overall focal length of the optical system 300 is 4.392 mm. For reference, FIG. 12 is a table representing aspherical coefficients of the optical system 300.

Figure 13:
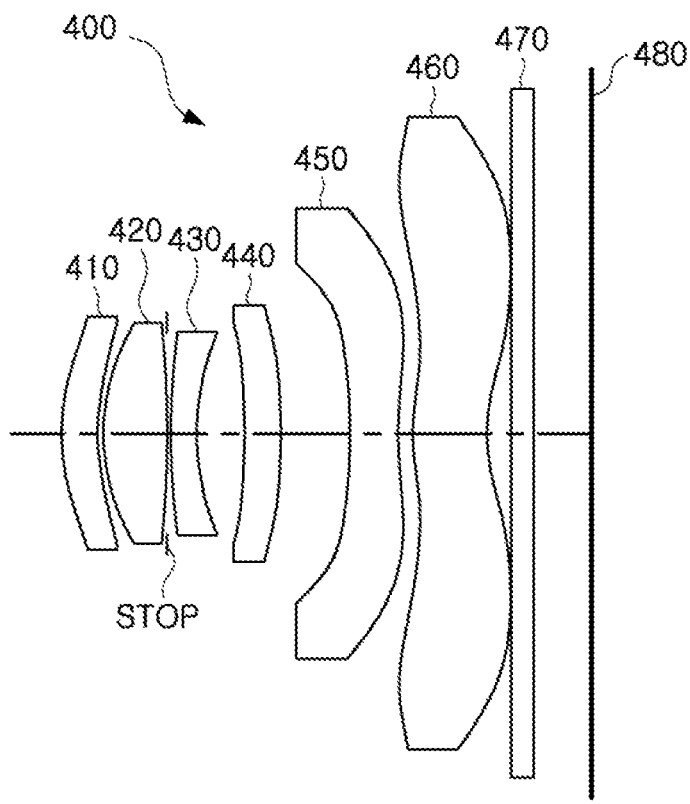
FIG. 13 is a view of an optical system, according to a fourth embodiment.

An optical system, according to a fourth embodiment, will be described with reference to FIG. 13.

The optical system 400, according to an embodiment, includes first to sixth lenses 410 to 460. The first to sixth lenses 410 to 460 are sequentially disposed from an object toward an imaging plane.

The first lens 410 has a negative refractive power. An object-side surface of the first lens 410 is convex, and an image-side surface thereof is concave. The first lens 410 has an aspherical shape. As an example, both of the object-side surface and the image-side surface of the first lens 410 are aspherical. The first lens 410 may be formed of a material having a refractive index of 1.547. A focal length of the first lens 410 may be −677.554 mm.

The second lens 420 has a positive refractive power. An object-side surface of the second lens 420 is convex, and an image-side surface thereof is convex. The second lens 420 has an aspherical shape. As an example, both of the object-side surface and the image-side surface of the second lens 420 are aspherical. The second lens 420 is formed of a material that is substantially the same as or similar to that of the first lens. As an example, the second lens 420 has a refractive index of 1.547, which is the same as that of the first lens. A focal length of the second lens 420 may be 2.800 mm.

The third lens 430 has a negative refractive power. An object-side surface of the third lens 430 is convex, and an image-side surface thereof is concave. The third lens 430 may have an aspherical shape. As an example, both of the object-side surface and the image-side surface of the third lens 430 may be aspherical. The third lens 430 has a refractive index higher than the refractive indices of the first and second lenses. As an example, a refractive index of the third lens 430 may be 1.657, which is higher than the refractive indices of the first and second lenses. A focal length of the third lens 430 may be −5.988 mm.

The fourth lens 440 has a positive refractive power. An object-side surface of the fourth lens 440 is concave, and an image-side surface thereof is convex. The fourth lens 440 has an aspherical shape. As an example, both of the object-side surface and the image-side surface of the fourth lens 440 are aspherical. The fourth lens 440 has a refractive index higher than the refractive indices of the first and second lenses. As an example, a refractive index of the fourth lens 440 is 1.657, which is higher than the refractive indices of the first and second lenses. A focal length of the fourth lens 440 may be 31.426 mm.

The fifth lens 450 has a negative refractive power. An object-side surface of the fifth lens 450 is concave, and an image-side surface thereof is concave. The fifth lens 450 has an aspherical shape. As an example, both of the object-side surface and the image-side surface of the fifth lens 450 are aspherical. An inflection point is formed on the fifth lens 450. As an example, one or more inflection points are formed on the image-side surface of the fifth lens 450. The fifth lens 450 has a refractive index higher than the refractive indices of the first and second lenses. As an example, a refractive index of the fifth lens 450 may be 1.657, which is higher than the refractive indices of the first and second lenses. A focal length of the fifth lens 450 may be −80.848 mm. In one example, the object-side surface of the fifth lens 450 is concave in a paraxial region and gradually flattens at edge portions thereof The sixth lens 460 has a negative refractive power. An object-side surface of the sixth lens 460 is convex, and an image-side surface thereof is concave. The sixth lens 460 has an aspherical shape. As an example, both of the object-side surface and the image-side surface of the sixth lens 460 are aspherical. An inflection point is formed on the sixth lens 460. As an example, one or more inflection points are formed on the object-side surface and the image-side surface of the sixth lens 460. The sixth lens 460 has a low refractive index. As an example, a refractive index of the sixth lens 460 may be 1.537, which is lower than the refractive indices of the first and second lenses. A focal length of the sixth lens 460 may be −10.783 mm.

The optical system 400 includes a filter 470 and an image sensor 480. The filter 470 is disposed adjacently to the image-side surface of the sixth lens 460. The filter 470 has a substantially flat plate. The filter 470 filters infrared rays from light refracted from the sixth lens 460.

The image sensor 480 is disposed behind the filter 470. The image sensor 480 has a predetermined size. As an example, a distance (IMH HT) (see FIG. 2) from an intersection point between an imaging plane of the image sensor 480 and an optical axis to a diagonal corner of the image sensor 480 is 3.50 mm.

The optical system 400 includes a stop STOP. The stop STOP is disposed between the second lens and the third lens.

Figure 14:
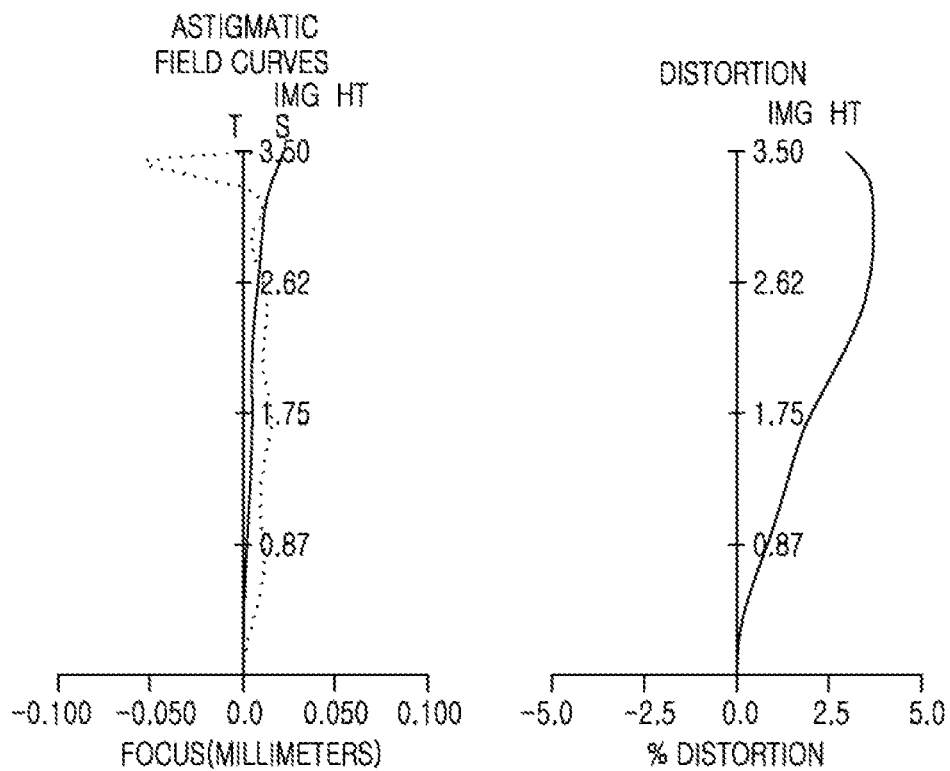
FIG. 14 illustrates graphs having curves representing aberration of the optical system, according to the fourth embodiment.

The optical system 400 configured as described above may represent aberration characteristics and optical characteristics as illustrated in FIGS. 14 and 15. As an example, an F number of the optical system 400, according to an embodiment is 2.00, an overall length (TTL), which is a distance from the object-side surface of the first lens to the imaging plane of the optical system 400, is 5.103 mm, and an overall focal length of the optical system 400 is 4.327 mm. For reference, FIG. 16 is a table representing aspherical coefficients of the optical system 400.

Figure 17:
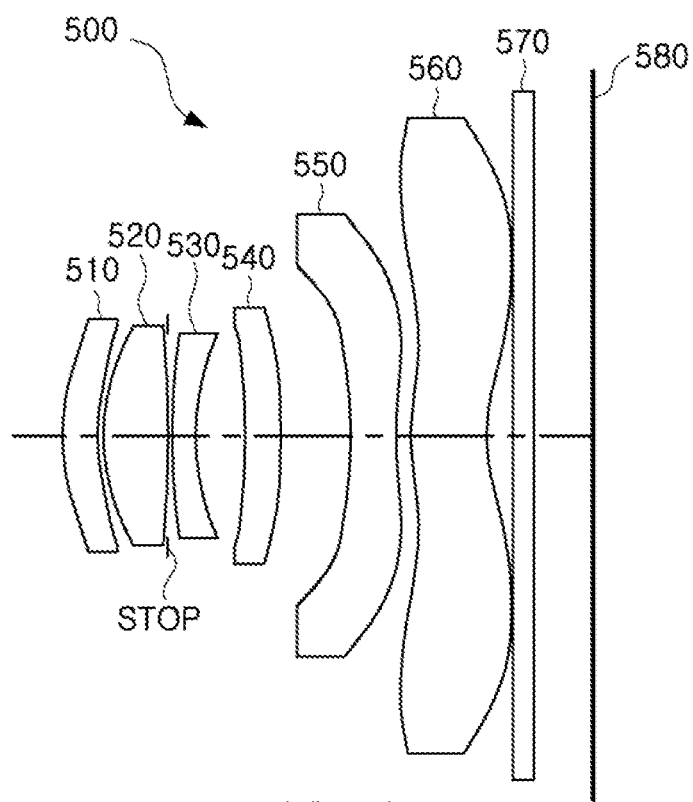
FIG. 17 is a view of an optical system, according to a fifth embodiment.

An optical system, according to a fifth embodiment, will be described with reference to FIG. 17.

The optical system 500, according to an embodiment, includes first to sixth lenses 510 to 560. The first to sixth lenses 510 to 560 are sequentially disposed from an object toward an imaging plane.

The first lens 510 has a negative refractive power. An object-side surface of the first lens 510 is convex, and an image-side surface thereof is concave. The first lens 510 has an aspherical shape. As an example, both of the object-side surface and the image-side surface of the first lens 510 are aspherical. The first lens 510 is formed of a material having a refractive index of 1.547. A focal length of the first lens 510 may be −9275.74 mm.

The second lens 520 has a positive refractive power. An object-side surface of the second lens 520 is convex, and an image-side surface thereof is convex. The second lens 520 has an aspherical shape. As an example, both of the object-side surface and the image-side surface of the second lens 520 re aspherical. The second lens 520 is formed of a material that is substantially the same as or similar to that of the first lens. As an example, the second lens 520 has a refractive index of 1.547, which is the same as that of the first lens. A focal length of the second lens 520 may be 2.816 mm.

The third lens 530 has a negative refractive power. An object-side surface of the third lens 530 is convex, and an image-side surface thereof is concave. The third lens 530 has an aspherical shape. As an example, both of the object-side surface and the image-side surface of the third lens 530 are aspherical. The third lens 530 has a refractive index higher than the refractive indices of the first and second lenses. As an example, a refractive index of the third lens 530 may be 1.657, which is higher than the refractive indices of the first and second lenses. A focal length of the third lens 530 may be −6.016 mm.

The fourth lens 540 has a positive refractive power. An object-side surface of the fourth lens 540 is concave, and an image-side surface thereof is convex. The fourth lens 540 has an aspherical shape. As an example, both of the object-side surface and the image-side surface of the fourth lens 540 are aspherical. The fourth lens 540 has a refractive index higher than the refractive indices of the first and second lenses. As an example, a refractive index of the fourth lens 540 is 1.657, which is higher than the refractive indices of the first and second lenses. A focal length of the fourth lens 540 may be 30.800 mm.

The fifth lens 550 has a negative refractive power. An object-side surface of the fifth lens 550 is concave, and an image-side surface thereof is concave. The fifth lens 550 has an aspherical shape. As an example, both of the object-side surface and the image-side surface of the fifth lens 550 are aspherical. An inflection point is formed on the fifth lens 550. As an example, one or more inflection points are formed on the image-side surface of the fifth lens 550. The fifth lens 550 has a refractive index higher than the refractive indices of the first and second lenses. As an example, a refractive index of the fifth lens 550 may be 1.657, which is higher than the refractive indices of the first and second lenses. A focal length of the fifth lens 550 may be −68.976 mm. In one example, the object-side surface of the fifth lens 550 is concave in a paraxial region and gradually flattens at edge portions thereof.

The sixth lens 560 has a negative refractive power. An object-side surface of the sixth lens 560 is convex, and an image-side surface thereof may be concave. The sixth lens 560 may have an aspherical shape. As an example, both of the object-side surface and the image-side surface of the sixth lens 560 are aspherical. An inflection point is formed on the sixth lens 560. As an example, one or more inflection points are formed on the object-side surface and the image-side surface of the sixth lens 560. The sixth lens 560 has a low refractive index. As an example, a refractive index of the sixth lens 560 may be 1.537, which is lower than the refractive indices of the first and second lenses. A focal length of the sixth lens 560 may be −11.437 mm.

The optical system 500 includes a filter 570 and an image sensor 580. The filter 570 is disposed adjacently to the image-side surface of the sixth lens 560. The filter 570 has a substantially flat plate. The filter 570 filters infrared rays from light refracted from the sixth lens 560.

The image sensor 580 is disposed behind the filter 570. The image sensor 580 has a predetermined size. As an example, a distance (IMH HT) (see FIG. 2) from an intersection point between an imaging plane of the image sensor 580 and an optical axis to a diagonal corner of the image sensor 580 is 3.50 mm.

The optical system 500 includes a stop STOP. The stop STOP is disposed between the second lens and the third lens.

Figure 18:
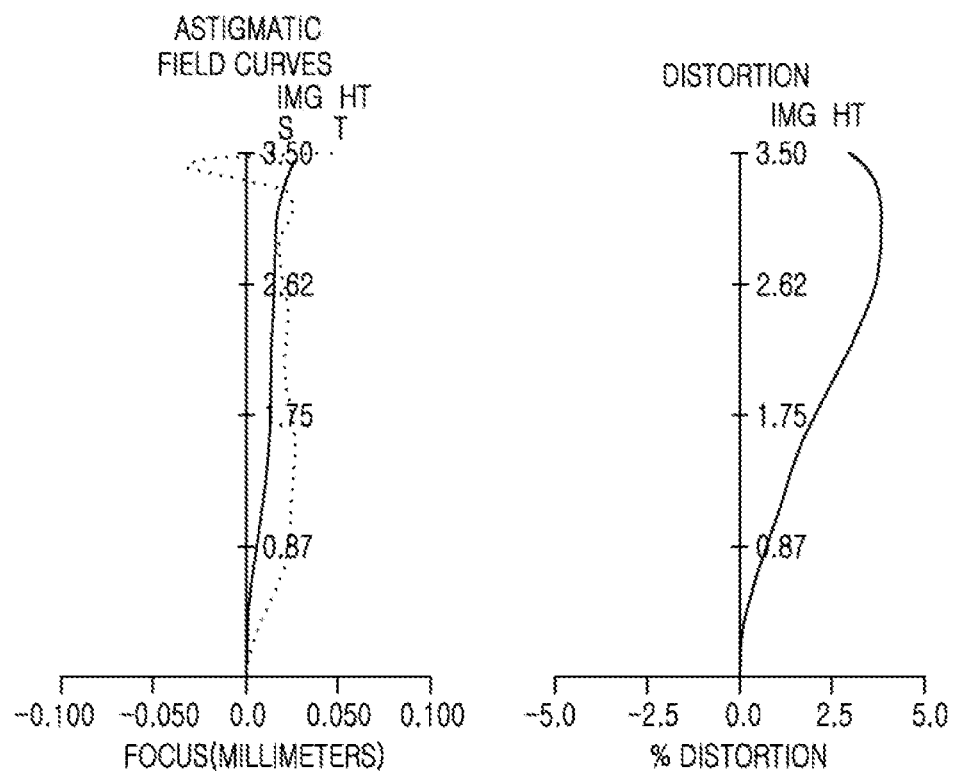
FIG. 18 illustrates graphs having curves representing aberration of the optical system, according to the fifth embodiment.

The optical system 500 configured as described above represents aberration characteristics and optical characteristics as illustrated in FIGS. 18 and 19. As an example, an F number of the optical system 500, according to an embodiment, is 1.98, an overall length (TTL), which is a distance from the object-side surface of the first lens to the imaging plane) of the optical system 500, is 5.102 mm, and an overall focal length of the optical system 500 is 4.303 mm. For reference, FIG. 20 is a table representing aspherical coefficients of the optical system 500.

Figure 21:
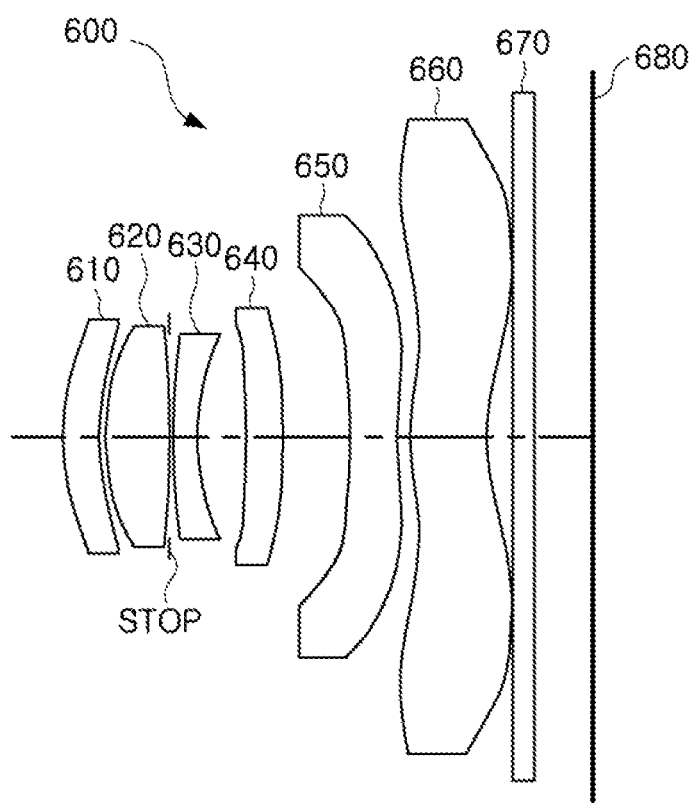
FIG. 21 is a view of an optical system, according to a sixth embodiment.

An optical system, according to a sixth embodiment, will be described with reference to FIG. 21.

The optical system 600, according to an embodiment, includes first to sixth lenses 610 to 660. The first to sixth lenses 610 to 660 may be sequentially disposed from an object toward an imaging plane.

The first lens 610 has a negative refractive power. An object-side surface of the first lens 610 is convex, and an image-side surface thereof is concave. The first lens 610 has an aspherical shape. As an example, both of the object-side surface and the image-side surface of the first lens 610 are aspherical. The first lens 610 may be formed of a material having a refractive index of 1.547. A focal length of the first lens 610 may be −5064.53 mm.

The second lens 620 has a positive refractive power. An object-side surface of the second lens 320 is convex, and an image-side surface thereof is convex. The second lens 620 has an aspherical shape. As an example, both of the object-side surface and the image-side surface of the second lens 620 are aspherical. The second lens 620 is formed of a material that is substantially the same as or similar to that of the first lens. As an example, the second lens 620 has a refractive index of 1.547, which is the same as that of the first lens. A focal length of the second lens 620 may be 2.818 mm.

The third lens 630 has a negative refractive power. An object-side surface of the third lens 630 is convex, and an image-side surface thereof is concave. The third lens 630 has an aspherical shape. As an example, both of the object-side surface and the image-side surface of the third lens 630 are aspherical. The third lens 630 has a refractive index higher than the refractive indices of the first and second lenses. As an example, a refractive index of the third lens 630 is 1.657, which is higher than the refractive indices of the first and second lenses. A focal length of the third lens 630 may be −5.971 mm.

The fourth lens 640 has a positive refractive power. An object-side surface of the fourth lens 640 is concave, and an image-side surface thereof is convex. The fourth lens 640 may have an aspherical shape. As an example, both of the object-side surface and the image-side surface of the fourth lens 640 may be aspherical. The fourth lens 640 may have a refractive index higher than the refractive indices of the first and second lenses. As an example, a refractive index of the fourth lens 640 may be 1.657, which is higher than the refractive indices of the first and second lenses. A focal length of the fourth lens 640 may be 29.146 mm.

The fifth lens 650 has a negative refractive power. An object-side surface of the fifth lens 650 is concave, and an image-side surface thereof is concave. The fifth lens 650 has an aspherical shape. As an example, both of the object-side surface and the image-side surface of the fifth lens 650 is aspherical. An inflection point is formed on the fifth lens 650. As an example, one or more inflection points is formed on the image-side surface of the fifth lens 650. The fifth lens 650 has a refractive index higher than the refractive indices of the first and second lenses. As an example, a refractive index of the fifth lens 650 is 1.657, which is higher than the refractive indices of the first and second lenses. A focal length of the fifth lens 650 may be −97.168 mm. In one example, the object-side surface of the fifth lens 650 is concave in a paraxial region and gradually flattens at edge portions thereof.

The sixth lens 660 has a negative refractive power. An object-side surface of the sixth lens 660 is convex, and an image-side surface thereof is concave. The sixth lens 660 has an aspherical shape. As an example, both of the object-side surface and the image-side surface of the sixth lens 660 are aspherical. An inflection point is formed on the sixth lens 660. As an example, one or more inflection points is formed on the object-side surface and the image-side surface of the sixth lens 660. The sixth lens 660 has a low refractive index. As an example, a refractive index of the sixth lens 660 may be 1.537, which is lower than the refractive indices of the first and second lenses. A focal length of the sixth lens 660 may be −10.966 mm.

The optical system 600 includes a filter 670 and an image sensor 680. The filter 670 is disposed adjacently to the image-side surface of the sixth lens 660. The filter 670 has a substantially flat plate. The filter 670 filters infrared rays from light refracted from the sixth lens 660.

The image sensor 680 is disposed behind the filter 670. The image sensor 680 has a predetermined size. As an example, a distance (IMH HT) (see FIG. 2) from an intersection point between an imaging plane of the image sensor 680 and an optical axis to a diagonal corner of the image sensor 680 may be 3.50 mm.

The optical system 600 includes a stop STOP. The stop STOP is disposed between the second lens and the third lens.

Figure 22:
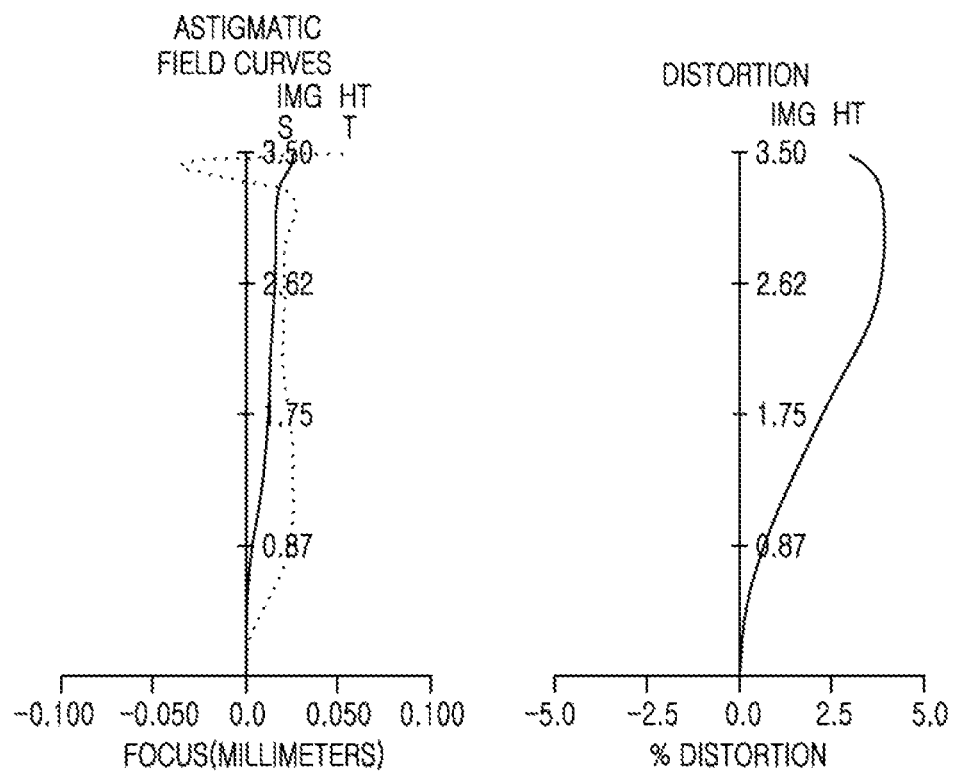
FIG. 22 illustrates graphs having curves representing aberration of the optical system, according to the sixth embodiment.

The optical system 600 configured as described above, represents aberration characteristics and optical characteristics as illustrated in FIGS. 22 and 23. As an example, an F number of the optical system 600, according to an embodiment, is 1.98, an overall length (TTL), which is a distance from the object-side surface of the first lens to the imaging plane of the optical system 600, is 5.102 mm, and an overall focal length of the optical system 600 is 4.298 mm. For reference, FIG. 24 is a table representing aspherical coefficients of the optical system 600.

The optical systems, according to the first to sixth embodiments, configured as described above satisfy all of the Conditional Expressions 1 through 17, as represented in Table 1.

TABLE 1

| Remark | Conditional Expression | First Embodiment | Second Embodiment | Third Embodiment | Fourth Embodiment | Fifth Embodiment | Sixth Embodiment |
|---|---|---|---|---|---|---|---|
| 1 | f1/f < 0 | −10565.046 | −9096.919 | −21.746 | −156.580 | −2155.795 | −1178.319 |
| 2 | V1 − V2 < 25 | 0.0 | 0.0 | 0.0 | 0.0 | 0.0 | 0.0 |
| 3 | 25 < V1 − V3 < 45 | 34.60 | 34.60 | 34.60 | 34.60 | 34.60 | 34.60 |
| 4 | 25 < V1 − V5 < 45 | 34.60 | 34.60 | 34.60 | 34.60 | 34.60 | 34.60 |
| 5 | 0.3 < f2/f < 1.5 | 0.621 | 0.631 | 0.618 | 0.647 | 0.654 | 0.656 |
| 6 | −3.0 < f3/f < −1.0 | −1.290 | −1.308 | −1.410 | −1.384 | −1.398 | −1.389 |
| 7 | 3.0 < |f4/f| | 35.360 | 15.807 | 14.209 | 7.262 | 7.158 | 6.781 |
| 8 | f5/f < −10 | −39260.348 | −92.017 | −44.659 | −18.684 | −16.031 | −22.607 |
| 9 | TTL/f < 1.5 | 1.160 | 1.159 | 1.162 | 1.179 | 1.186 | 1.187 |
| 10 | f1/f2 < 0 | −17021.600 | −14405.667 | −35.168 | −241.959 | −3294.040 | −1797.493 |

TABLE 1-continued

| Remark | Conditional Expression | First Embodiment | Second Embodiment | Third Embodiment | Fourth Embodiment | Fifth Embodiment | Sixth Embodiment |
|---|---|---|---|---|---|---|---|
| 11 | −1.2 < f2/f3 < 0 | −0.481 | −0.483 | −0.439 | −0.468 | −0.468 | −0.472 |
| 12 | BFL/f < 0.5 | 0.235 | 0.240 | 0.250 | 0.236 | 0.239 | 0.241 |
| 13 | D2/f < 0.1 | 0.014 | 0.014 | 0.009 | 0.012 | 0.013 | 0.013 |
| 14 | 0.3 < r7/f < 1.4 | 0.519 | 0.528 | 0.554 | 0.552 | 0.556 | 0.554 |
| 15 | 1.0 < r11/f | 1.537 | 1.451 | 33.711 | 12.975 | 11.042 | 15.879 |
| 16 | 74 < FOV | 74.1 | 75.2 | 75.3 | 76.2 | 76.4 | 76.4 |
| 17 | F number < 2.1 | 2.09 | 2.07 | 2.08 | 2.00 | 1.98 | 1.98 |

As set forth above, the optical system, according to an embodiment, photographs a clear image.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
   a first lens comprising a negative refractive power and a convex object-side surface;
   a second lens comprising a convex image side surface in a paraxial region;
   a third lens comprising a negative refractive power and a convex object-side surface;
   a fourth lens comprising a concave object side surface in a paraxial region;
   a fifth lens comprising a negative refractive power and a concave image side surface in a paraxial region; and
   a sixth lens comprising a negative refractive power and comprising an inflection point on an image-side surface thereof,
   wherein the first to sixth lenses are sequentially disposed from an object toward an imaging plane.

2. The optical system of claim 1, wherein, V1, an Abbe number of the first lens and, V3, an Abbe number of the third lens satisfy 25<V1−V3<45.

3. The optical system of claim 1, wherein, f, an overall focal length of the optical system and, f2, a focal length of the second lens satisfy 0.3<f2/f<1.5.

4. The optical system of claim 1, wherein, f, an overall focal length of the optical system and, TTL, a distance from the object-side surface of the first lens to the imaging plane satisfy TTL/f<1.5.

5. The optical system of claim 1, wherein, f, an overall focal length of the optical system and, r11, a radius of curvature of an image-side surface of the fifth lens satisfy 1.0<r11/f.

6. The optical system of claim 1, wherein the second lens has a positive refractive power.

7. The optical system of claim 1, wherein the fourth lens has a positive refractive power.

8. An optical system, comprising:
   a first lens comprising a negative refractive power and a convex object-side surface;
   a second lens comprising a convex object-side surface and a convex image-side surface in a paraxial region;
   a third lens having a negative refractive power;
   a fourth lens comprising a concave object-side surface in a paraxial region;
   a fifth lens comprising a negative refractive power; and
   a sixth lens comprises an inflection point formed on an image-side surface thereof,
   wherein the first to sixth lenses are sequentially disposed from an object toward an imaging plane, and
   wherein f5/f<−10; where f5 is a focal length of the fifth lens and f is an overall focal length of the optical system.

9. The optical system of claim 8, wherein the first lens comprises a concave image-side surface.

10. The optical system of claim 8, wherein the third lens comprises a convex object-side surface and a concave image-side surface.

11. The optical system of claim 8, wherein the fourth lens comprises a convex image-side surface.

12. The optical system of claim 8, wherein the fourth lens has a positive refractive power.

13. The optical system of claim 8, wherein the fifth lens comprises a concave image-side surface.

14. The optical system of claim 8, wherein the sixth lens comprises a convex object-side surface and the image-side surface thereof is concave.

15. The optical system of claim 8, wherein the sixth lens has a negative refractive power.

16. An optical system, comprising:
   a first lens comprising a convex object-side surface and a concave image-side surface;
   a second lens comprising a convex object-side surface and a convex image-side surface in a paraxial region;
   a third lens comprising a convex object-side surface and a concave image-side surface;
   a fourth lens comprising a concave object-side surface in a paraxial region and a convex image-side surface;
   a fifth lens comprising a concave object-side surface and a concave image-side surface in a paraxial region; and
   a sixth lens, wherein
   the second lens is formed of a material that is substantially same as that of the first lens,
   the third lens, the fourth lens, and the fifth lens each have a refractive index higher than the refractive indices of each of the first and second lenses, and
   the sixth lens has a refractive index lower than the refractive indices of each of the first and second lenses.

17. The optical system of claim 16, wherein, f, an overall focal length of the optical system and, f1, a focal length of the first lens satisfy f1/f<0.

18. The optical system of claim 16, wherein, f, an overall focal length of the optical system, and r7 a radius of curvature of the image-side surface of the third lens satisfy 0.3<r7/f<1.4.

19. The optical system of claim 16, wherein, FOV, a field of view of the optical system satisfy 74<FOV.

20. The optical system of claim 16, wherein upper and lower ends of the fifth lens extend horizontally towards an object side, parallel to upper and lower portions of the first through fourth lenses.

21. The optical system of claim 16, wherein the object-side surface of the fifth lens is concave in a paraxial region and gradually flattens at edge portions thereof.

22. The optical system of claim 16, wherein the first lens comprises a negative refractive power, the second lens comprises a positive refractive power, the third lens comprises a negative refractive power, the fourth lens comprises a positive refractive power, the fifth lens comprises a negative refractive power, and the sixth lens comprises a negative refractive power.

\* \* \* \* \*